United States Patent
Mizushina et al.

(10) Patent No.: US 6,484,184 B1
(45) Date of Patent: Nov. 19, 2002

(54) DATABASE NETWORK SYSTEM

(75) Inventors: Shizuo Mizushina, Hamamatsu (JP); Atsushi Adachi, Shizuoka (JP)

(73) Assignee: Hamanen Co., Ltd., Hamamatsu (JP)

( * ) Notice: Subject to any disclaimer, the term of this patent is extended or adjusted under 35 U.S.C. 154(b) by 0 days.

(21) Appl. No.: 09/522,033

(22) Filed: Mar. 8, 2000

(30) Foreign Application Priority Data

Mar. 31, 1999 (JP) .......................................... 11-090827

(51) Int. Cl.[7] .............................................. G06F 17/30
(52) U.S. Cl. ................................................... 707/104.1
(58) Field of Search ..................................... 707/104.1

(56) References Cited

U.S. PATENT DOCUMENTS

| | | | |
|---|---|---|---|
| 4,322,842 A | | 3/1982 | Martinez |
| 4,888,706 A | | 12/1989 | Rush et al. |
| 5,689,233 A | | 11/1997 | Kurisu et al. |
| 5,732,510 A | * | 3/1998 | Sutton et al. ............... 109/1 S |
| 5,761,083 A | * | 6/1998 | Brown et al. ................ 340/3.1 |
| 5,894,422 A | | 4/1999 | Chasek |
| 5,943,673 A | * | 8/1999 | Felouzis et al. .............. 707/1 |
| 6,121,875 A | * | 9/2000 | Hamm et al. ......... 250/214 AL |
| 6,169,476 B1 | * | 1/2001 | Flanagan ............... 340/286.02 |
| 6,236,365 B1 | * | 5/2001 | LeBlanc et al. ............ 342/450 |
| 6,246,320 B1 | * | 6/2001 | Monroe ....................... 340/506 |
| 6,356,554 B1 | * | 3/2002 | Pickett et al. ............... 370/353 |
| 6,352,222 B1 | * | 5/2002 | Maeda et al. ................ 244/158 |

* cited by examiner

Primary Examiner—Wayne Amsbury
(74) Attorney, Agent, or Firm—Venable; Robert J. Frank

(57) ABSTRACT

A database network system is capable of recognizing in a short time (within several minutes) the state of damage or the like of city lifelines (waterworks, electricity, and gas supplies) over a whole city. A database network system according to the present invention includes a center station, relay database stations (RDSs), and terminal stations. A terminal station group includes a plurality of terminal stations for acquiring changing information to accumulate the information as data and for transmitting the data as requested. Each of the plurality of relay database stations (RDSs) is arranged for the terminal station group, and accumulates pieces of information sequentially received from the terminals as specific data and other data and transmits the data as requested. The center station sequentially receives parts of the specific data and other data of an arbitrary one of the relay database stations (RDSs) from the corresponding relay database station, performs a receiving operation of all the data and the specific information data a plurality of times by performing the receiving operation a plurality of times, and accumulates the data as needed.

10 Claims, 1 Drawing Sheet

DATABASE NETWORK SYSTEM

BACKGROUND OF THE INVENTION

1. Field of the Invention

The present invention relates to a city lifeline information collection system capable of collecting information related to lifeline services such as gas supplies, waterworks, and electricity, in particular, for rapidly collecting data (specific data) related to a state of emergency.

2. Description of the Related Art

U.S. Pat. No. 5,689,233, U.S. Pat. No. 4,888,706, U.S. Pat. No. 4,322,842, and U.S. Pat. No. 5,894,422 are related to a lifeline information collecting system, an emergency information collection, or emergency information offering system. U.S. Pat. No. 5,689,233 discloses an emergency information offering system. An object of the invention is to attain proper information collecting and offering functions by combining information infrastructures and public infrastructures upon emergencies involving lifeline facilities.

Problems caused when conventional communication equipment is used will be described below in the case where a telephone network is used.

A collection system using a telephone network is used in practice to collect general pieces of lifeline information relating to houses; for example the state of gas supplies, waterworks, and electricity, or the state in which undesirable conditions occur, however, the information collection system using the telephone line is not effective when communications are congested during a disaster. In addition, when pieces of information of 100 bytes per terminal, including information on gas supplies, waterworks, and electricity, are to be collected for 200,000 terminals or more, the number of hours required when the telephone network is used is determined by 30 seconds×200,000 terminals=1,667 hours. Therefore, a continuous monitoring system cannot be easily realized by using a telephone network.

The problems to be solved by the present invention are as follows.

1. An information collection/monitoring system for recognizing in a short time (within several minutes) the state of damage of city lifelines (waterworks, electricity, and gas supplies) caused by a large earthquake over the whole city has not been developed in Japan or other countries. The development of such a system is considered as a problem which must be quickly solved for a countermeasure against disasters.

2. The present invention develops a system which recognizes information on water meters, electricity meters, and gas meters installed in houses and collects/monitors this information over the whole city in real time, so as to solve the above problem.

3. Since this system is an information collection system used during emergencies, delay and interruption of information collection caused by congestion of communications cannot be permitted. The problem of congestion cannot be solved by using a conventional communication system, and should be solved by developing a dedicated information collection system.

4. Since a dedicated system requires its functions and performances to be regulated, it is a technical problem to develop a system appropriate to the object.

5. It has been a difficult technical problem to develop an information collection system which continuously monitors lifelines of the whole city and has a function of collecting emergency information in a short time, while at the same time collecting detailed lifeline information.

6. This technical problem is solved by a new network configuration technique, i.e., a database network, obtained by combining high-speed databases distributed in a multi-layer radio polling system. When a disaster occurs, in order to recognize the state of the disaster, it is required to recognize the states of the lifelines of all houses within several minutes. In addition, in a disaster, communications are congested by events occurring at the same time. Therefore, assurance of communications is required even-during disasters.

7. When a disaster occurs, in order to recognize the state of the disaster, the condition of the system up to the occurrence of the disaster must be recognized, and it must be recognized that the system is operating normally.

SUMMARY OF THE INVENTION

It is a main object of the present invention to provide a new database network system which is different from a conventional communication system.

It is another object of the present invention to constitute an information collection/monitoring system for recognizing in a short time (within several minutes) the state of damage of city lifelines (waterworks, electricity, and gas supplies) caused by a large earthquake over a whole city by using the database network system.

It is still another object of the present invention to provide a database network system, according to the above objects, which can recognize a state of the lifelines immediately before the damage caused by the large earthquake.

To this end, according to one aspect of the present invention, there is provided a database network system for collecting information comprising a terminal station group constituted by a plurality of terminal stations for acquiring changing information, to accumulate the information as data, and to transmit the data in accordance with a request, a plurality of relay database stations, each arranged for the terminal station group, for accumulating pieces of information sequentially received from the terminals as specific data and other data, and for transmitting the data in accordance with a request, and a center station for sequentially receiving parts of the specific data and the other data of an arbitrary one of the relay database stations from the corresponding relay database station, for performing a receiving operation of all the data and the specific information data a plurality of times by performing the receiving operation a plurality of times, and for accumulating all the data and the specific information data as needed.

The plurality of relay database stations includes at least one upper-layer relay database station group and a plurality of lower-layer relay database station groups arranged for one of the upper-layer relay database stations, the stations of the lower-layer relay database station group collect information of the terminal station group constituted by the plurality of terminal stations, and the center station collects information from the upper-layer relay database station.

The changing information is city lifeline information of gas supplies, electricity, waterworks, and the like, and the terminal stations are living unit terminals of houses and the like.

Specific information is extracted from changing house terminal information depending on a degree of emergency, at least two types of information including the original house terminal information:are generated, and the at least two types of information are collected in the center station for a collection time which changes depending on the degree of emergency.

The database network system is continuously operated, and a main database of the center station is designed to always hold the history of the operation by accumulating specific information data and the other data for a predetermined period of time.

As a combination of the pieces of changing information, one combination of data for reading meter values included in one of lifeline data of meters, data for collecting/monitoring information related to various maintenance jobs, and information data related to security, care of elderly people, water pressures of fire hydrants, and monitors of air-conditioners can be employed.

DESCRIPTION OF THE PREFERRED EMBODIMENTS

Figure 1:
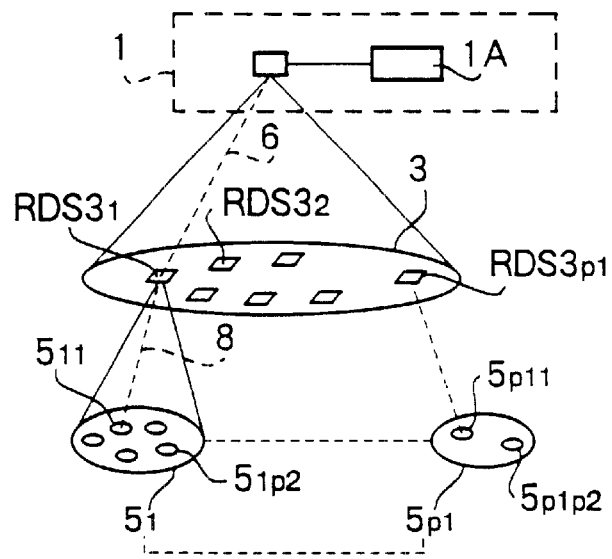
FIG. 1 is a conceptual diagram of a lifeline information collection/monitoring system constituted by combining an asynchronous two-layer polling system serving as a first embodiment of a database network system according to the present invention and a high-speed database.

Embodiments of systems according to the present invention will be described below with reference to the accompanying drawings. FIG. 1 is a conceptual diagram of a lifeline information collection/monitoring system constituted by combining an asynchronous two-layer polling system serving as the first embodiment of a database network system according to the present invention and a high-speed database.

A center station 1 comprises a main database 1A for arranging collected data and accumulating the data for a required period of time. The center station 1 sequentially polls relay database stations. (RDS) $3_1$ to $3_{p1}$ of a relay database station group 3 to collect data.

The relay database stations $3_1$ to $3_{p1}$ are related to corresponding terminal groups, and sequentially poll terminal stations, e.g., the terminal stations each corresponding to one household serving as a living unit, to collect data.

Although each of the relay database stations $3_1$ to $3_{p1}$ has the same function as that of the main database 1A, this is omitted in FIG. 1 for descriptive convenience.

Terminal station groups $5_1$ to $5_{p1}$ are related to the relay database stations $3_1$ to $3_{p1}$, respectively. The terminal station group $5_1$ related to the relay database station $3_1$ includes $p_2$ terminal stations $5_{11}$ to $5_{1p2}$. The relay database station $3_1$ sequentially polls terminal stations $5_{11}$ to $5_{1p2}$ to collect data. The relay database station $3_2$ sequentially polls terminal stations $5_{21}$ to $5_{2p2}$ to collect data. The relay database station $3_{p1}$ sequentially polls terminal stations $5_{p11}$ to $5_{p1p2}$ to collect data. The sequential polling operations in the relay database stations are performed in parallel or almost in parallel to each other. Upper-layer communication is indicated by a dotted line 6, and an effective data transmission rate of communication between the center station 1 and the relay database station $3_1$ or the like is represented by $r_1$. Lower-layer communication is indicated by a dotted line 8, and an effective data transmission rate of communication between the relay database station $3_1$ and a terminal station or the like is represented by $r_2$. As communication media, various media including priority communication in, especially, the lower-layer communication are expected. However, a radio communication medium is used in this embodiment.

As the first embodiment of the database network system, a system for recognizing within ten minutes the state of damage of city lifelines (waterworks, electricity, or gas supply systems) caused by a large earthquake will be described below.

Signals (lifeline information) representing the states of water, gas, and electricity supplies are collected and continuously monitored through meters installed in houses. Collection, analysis, and accumulation/holding of the lifeline information are performed by using a dedicated network structured by combining radio communication devices and computers. In this case, each house corresponds to a terminal station, and information obtained from so-called electronic meters (or microcomputer meters) is used as the lifeline information. The electronic meter has functions of performing collection, holding, transmission, updating, and the like, of information data (quantity used or the like).

Examples of conditions of the database network system are as follows.
1. The number of house terminals: about 260,000
2. Lifeline information (per house terminal):
   waterworks: 20 bytes
   gas: 20 bytes
   electricity: 20 bytes
   other: 40 bytes
   total: 100 bytes
Information which has a high degree of emergency and must be continuously monitored is
   10 bytes/house terminal
3. Pieces of information having a high degree of emergency and which must be continuously monitored are periodically collected from the 260,000 house terminals every several minutes and updated. The collection/updating time is set at 10 minutes or less. In addition, a time record of the last 24 hours is always held.
4. All the collected pieces of lifeline information are updated as needed (or periodically), and the latest contents of the lifeline information are held in the database in the system.

The realization of a system satisfying the above requests uses the techniques (combinations thereof) described below.
1. A multi-layer radio polling system is used.
2. A conceptual view of the configuration of a lifeline information collection system constituted by combining a two-layer polling system and a high-speed database is shown in FIG. 1.
3. Pieces of house terminal lifeline information collected by a polling scheme (1) have given addresses, and (2) are classified by designated items. Therefore, since the pieces of lifeline information collected from the house terminals have a database structure, a computer (PC) for acquiring and processing the pieces of lifeline information is regarded as a database, and functions and characteristics of the database are effectively used.
4. In addition to arrangement of the main database device 1A in the center station 1, databases are distributed in the relay stations $3_i$.
5. Databases capable of updating a large quantity of data at high speed are used as the main database device 1A and the relay station database devices,.
6. A relay station in which a database having a high-speed data updating function is arranged is called a relay database station (to be referred to as an RDS hereinafter).

7. In FIG. 1, the RDS mainly has four functions.

(1) Communication control of a lower polling layer.

(2) Acquisition of lifeline information ($b_1$ bytes/terminal, in this embodiment $b_1$=100 bytes) from a house terminal.

(3) Data having a high degree of emergency or specific data is extracted, and data sets (called event change information or specific data information) of ($b_2$ bytes/terminal, in this embodiment $b_2$=10 bytes)×$p_2$ are generated.

(4) Division of lifeline information 100 bytes/terminal (the number of divided portions is n), and holding of the divided portions for a predetermined period of time.

8. The center station 1 sequentially polls $p_1$ relay database stations to collect information. For one polling period, [(10+100/n)×$p_2$] bytes are collected from each RDS.

9. As a result of item 7, every one polling period, event change information of (10 bytes/terminal)×$p_2$×$p_1$ is collected in the center station 1. Here, $p_2$×$p_1$ is the total number of house terminals.

10. As a result of item 7, every n polling periods, lifeline information of (100 bytes/terminal)×$p_2$×$p_1$ is collected in the center station. More specifically, every n periods, pieces of lifeline information from all the house terminals are collected.

11. According to items 9 and 10, the following is understood: From all the house terminals to the center station 1, (1) event change information having a high degree of emergency is transmitted for a short time, and (2) all pieces of lifeline information are transmitted. The above two objects can be achieved by using one information transmission path.

12. An upper-layer polling period $T_1$ is given by the following equation:

$$T_1=[8\times(10+100/n)\,p_2\times p_1]/r_1$$

where $r_1$ is the effective data transmission rate of the upper polling layer. When the number of all house terminals $p_2\times p_1$ is given, the polling period $T_1$ is mainly determined by $r_1$.

13. When the upper limit of $T_1$ is given to use a network, according to the above equation, the lower limit of $r_1$ is almost determined.

14. A polling period $T_2$ of the lower polling layer is given by:

$$T_2=8\times 100\times p_2/r_2,$$

where $r_2$ is the effective data transmission rate of the lower polling layer.

15. The effective data transmission rate $r_1$ of the upper polling layer is given by:

$$1/r_1=1/r_{d1}+1/r_{u1},$$

where $r_{d1}$ is a data transmission rate in bits per second (bps) of a communication line for connecting an RDS and the center station 1 to each other, and $r_{u1}$ is a data updating rate of a database in the center station.

16. The effective data transmission rate $r_2$ of the lower polling layer is given by:

$$1/r_2=1/r_{d2}+1/r_{u2},$$

where $r_{d2}$ is a data transmission rate of a transmission line for connecting house terminal stations and an RDS, and $r_{u2}$ is a data updating rate of a database in the RDS.

17. The upper polling layer and the lower polling layer operate asynchronously. In order to ensure that data collected in the center station and the upper-layer RDS are the latest data collected in the RDS, the condition $T_1 \geq T_2$ must be satisfied.

18. When the condition $T_1=T_2$ is satisfied, all the data collected in the lower polling layer are sent to the upper polling layer. For this reason, the data transfer efficiency is 100%.

19. At this time, the effective data transmission rate $r_2$ of the lower polling layer and the effective data transmission rate $r_1$ of the upper polling layer have the following relationship:

$$r_2=r_1\times(1/p_1)\times[100/(10+100/n)],$$

where $(1/p_1)$ is a required rate reduction effect obtained by a parallel operation of $p_1$ lower polling cells, and [100/(10+100/n)] is an adjustment effect obtained by a ratio of quantities of transmission information.

20. Actually, $r_2$ is set to be slightly larger than the above value:

$$r_2=r_1\times(1/p_1)\times[100/(10+100/n)]\times(1+\delta)$$

where $\delta<<1$

21. The memory capacity required for a database in an RDS:

(1) 100×$p_2$ bytes: 100 bytes of data are collected from $p_2$ house terminals and stored.

(2) 10×$p_2$ bytes: 10 bytes are extracted from 100 bytes, and 10 bytes×$p_2$ are stored.

22. The memory capacity required for a database in the center station:

(1) 100×$p_2$×$p_1$ bytes: Pieces of lifeline information collected from all the house terminals are stored and held.

(2) 10×$p_2$×$p_1$×(24×60/$T_1$) bytes: Pieces of event change information collected from all the house terminals for the latest 24 hours are stored and held.

23. (Data quantity of each layer of system)

TABLE 1

| | UNIT (NUMBER) | QUANTITY OF INFORMATION (BYTES)/UNIT | TOTAL QUANTITY (BYTES) |
|---|---|---|---|
| HOUSE TERMINAL LEVEL | $p_2 \times p_1$ | 100 | $100 \times p_2 \times p_1$ |
| RDS LEVEL | $p_1$ | $100 \times p_2$ | $100 \times p_2 \times p_1$ |
| | | $10 \times p_2$ | $10 \times p_2 \times p_1$ |
| CENTER STATION | 1 | $100 \times p_2 \times p_1$ | $100 \times p_2 \times p_1$ |
| | | $10 \times p_2 \times p_1 \times 24 \times 60/T_1$ | $10 \times p_2 \times p_1 \times 24 \times 60/T_1$ |

24. This system is a system which basically receives lifeline information of 100×$p_2$×$p_1$ bytes generated by the house terminals and accumulates the information in the relay/database station (RDS) layer and the center station. The data generated by data processing in the system are accumulated in the layer in which the data are generated and the layer thereabove.

25. The memory capacity which must be held by the system is basically twice (the number of layers). To this memory capacity, a capacity which is twice (RDS and center station) the quantity of data generated in the system is added.
26. For the cost of doubling the memory capacity, the function of collecting information having a high degree of emergency for a short time can be obtained.
27. The high-speed database devices are distributed to make it possible to realize a network which is appropriate to achieve the objects of the invention by using a communication path having a limited data transmission rate.
28. The network in which the high-speed database devices are distributed use a communication path having a limited data transmission rate is called a database network.
29. The database network technique becomes a practically useful technique by the development of the high-speed database technique and a reduction in price of a large-scale memory.
30. (Approximate definition of the high-speed database)

The effective data transmission rate $r_1$ of the upper polling layer is given by:

$$1/r_1 = 1/r_{d1} + 1/r_{u1},$$

where $r_{d1}$ is a data transmission rate (bps) of a communication line for connecting an RDS and the center station, and $r_{u1}$ is a data updating rate of a database in the center station. The effective data transmission rate $r_2$ of the lower polling layer is given by:

$$1/r_2 = 1/r_{d2} + 1/r_{u2},$$

where $r_{d2}$ is a data transmission rate of a communication line for connecting a house terminal station and an RDS, and $r_{u2}$ is a data updating rate of a database in the RDS. A database which satisfies $r_{d1} \ll r_{u1}$ and $r_{d2} \ll r_{u2}$ is defined as a high-speed database.

31. (Method of determining the number of relay/database stations (RDS) $p_1$)

A penalty function is defined for the database network by the following equation:

$$f = a_1 p_1 + a_2 p_2,$$

where $a_1$ and $a_2$ are communication error generation rates per line connection in the upper polling layer and the lower polling layer. Since $p_2 \times p_1$ is equal to the number (C) of house terminals, $$p_2 \times p_1 = C$$

is satisfied. When the above equations are combined, the following equation is obtained:

$$f = a_1 p + a_2 (C/p_1).$$

When the penalty function f has an extreme value when $\delta f / \delta p_1 = 0$ is satisfied:

$$\delta f / \delta p_1 = a_1 - a_2 (C/p_1^2) = 0.$$

Therefore, the following equations are obtained:

$$p_1 = (a_2/a_1)^{(1/2)} \times (C)^{(1/2)}$$

$$p_2 = (a_1/a_2)^{(1/2)} \times (C)^{(1/2)}.$$

When $p_1$ and $p_2$ are selected according to the above equations, the expected value of the communication error rate of the whole network is minimized.

EXAMPLE

Design of a two-layer polling information collection/monitor system (Example 1) which is one example of database networks will be described below.

(Requirement)

The number of all house terminals = $p_2 \times p_1 = 2^{18} = 262144$

Requirement for polling period time $T_1$: $T_1 \leq 5$ minutes (Design)

The number (n) of divided portions of 100 byte data = 10

Required upper polling layer data transmission rate: $r_1 > 139.81$ kbps

The number of RDS: $p_1 = 1024$ (selected by designer)

The number of house terminals/the number of RDS: $p_2 = 262144/1024 = 256$

Required lower polling layer data transmission rate: $r_2 > 682.7 \times (1+\delta) = 685$ bps.

Event change information collection time: one polling period = 5 minutes

Detailed lifeline information collection time: $T_1 \times n = 50$ minutes

Database memory in RDS: 25.6 kilobytes + 2.56 kilobytes = 28.2 kilobytes

Database memory in center station:
26.2 MB (one frame of lifeline information) and
$2.62 \times 24 \times 60/5 = 755$ MB (event change information for 24 hours)

(Adequacy of $p_1$ and $p_2$ Selection)

Assumption 1: It is assumed that the ratio of the error generation rate $a_1$ per line connection in the upper polling layer to the error generation rate $a_2$ per line connection in the lower polling layer is 1:1. In this case, the number of RDSs which minimize the error generation rate of the whole network is given by:

$$p_1 = p_2 = (C)^{(1/2)} = (262144)^{(1/2)} = 512.$$

Assumption 2: It is assumed that the ratio of $a_1$ to $a_2$ is 1:4. In this case, the number of RDSs which minimize the error generation rate of the whole network is given by:

$$p_1 = (a_2/a_1)^{(1/2)} \times (C)^{(1/2)} = 2 \times 512 = 1024$$

$$p_2 = (a_1/a_2)^{(1/2)} \times (C)^{(1/2)} = 0.5 \times 512 = 256$$

The upper-layer communication line error generation rate may be frequently higher than the lower-layer communication line error generation rate. In this case, the number selected by the designer is adequate.

When the database network technique is extended to increase the number of layers of the network from two to three, the characteristics of the database network described above can be extended.

Figure 2:
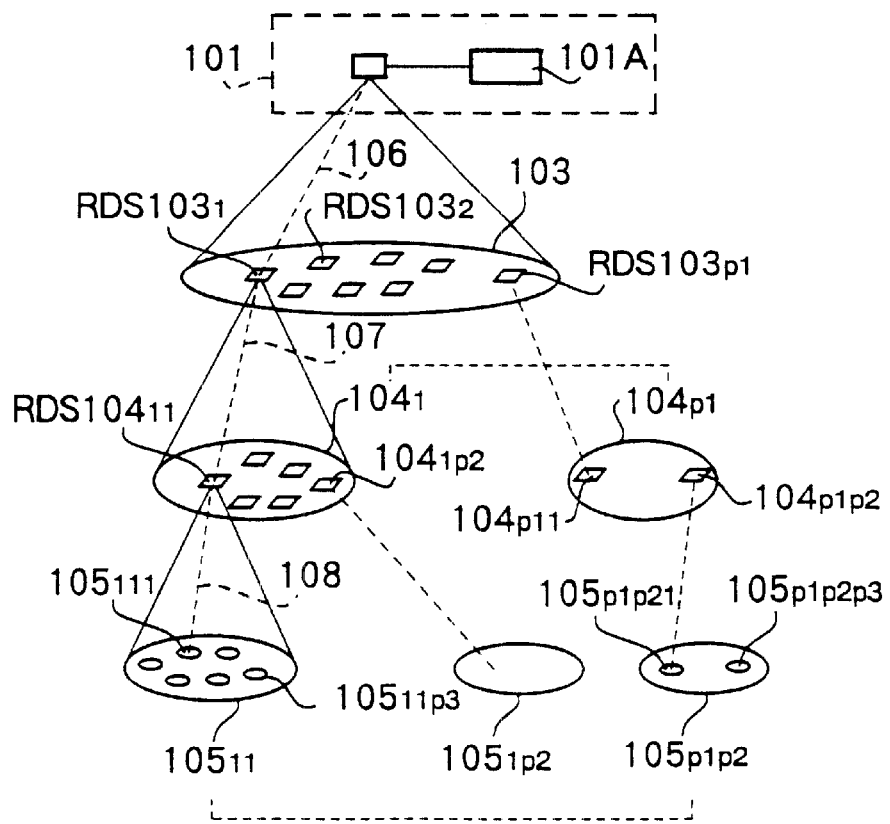
FIG. 2 is a conceptual diagram of a lifeline information collection/monitoring system constituted by combining an asynchronous three-layer polling system serving as a second embodiment of the database network system according to the present invention and a high-speed database.

1. FIG. 2 is a conceptual diagram of the configuration of a three-layer database network according to the second embodiment. In this configuration, a relay database has two layers, i.e., an upper layer and a lower layer. A center station 101 comprises a main database 101A. The center station 101 polls upper-layer relay database stations $103_1$, $103_2$ to $103_{p1}$ included in an upper-layer relay database station group 103 to collect data of the upper-layer relay database stations. Each upper-layer relay database station polls lower-layer relay database stations of a related lower-layer relay database station group to collect data of the lower-layer relay database stations. The upper-layer relay database station $103_1$ polls lower-layer relay database stations $104_{11}$ to $104_{1p2}$ related to the upper-layer relay database station $103_1$ to collect data of the lower-layer relay database stations.

The lower-layer relay database station polls terminal stations of a terminal station group related to the lower-layer relay database station to collect data of each terminal station.

For example, the lower-layer relay database station $104_{11}$ polls terminals $105_{111}$ to $105_{11p3}$ of the terminal station group related to the lower-layer relay database station $104_{11}$. A lower-layer relay database station $104_{p1p2}$ polls terminal stations $105_{p1p21}$ to $105_{p1p23}$ of a terminal station group related to the lower-layer relay database station $104_{p1p2}$. A dotted line 106 indicates upper-layer communication, and the effective data transmission rate of the upper-layer communication is represented by $r_1$. A dotted line 107 indicates intermediate-layer communication, and the effective data transmission rate of the intermediate-layer communication is represented by $r_2$. A dotted line 108 indicates lower-layer communication, and the effective data transmission rate of the lower-layer communication is represented by $r_3$.

2. More specifically, in addition to arrangement of the main database 101A in the center station 101, databases (not shown) are also distributed in the lower-layer relay stations and the upper-layer relay stations.

3. The lower-layer and upper-layer relay stations in which high-speed databases are arranged are called a lower-layer relay database station (lower-layer RDS) and an upper-layer relay database station (upper-layer RDS).

4. In FIG. 2, the lower-layer RDS mainly has four functions. (1) Communication control of a lower polling layer. (2) Acquisition of lifeline information (100 bytes/terminal) from a house terminal. (3) Data having a high degree of emergency is extracted, and data sets (event change information) of (10 bytes/terminal)×$p_3$ are generated. (4) Division of lifeline information of 100 bytes/terminal (the number of divided portions is $n_3$), and holding of the divided portions for a predetermined period of time.

5. In FIG. 2, the upper-layer RDS mainly has five functions.
   (1) Communication control of an intermediate polling layer.
   (2) Acquisition of event change information (10 bytes×$p_3$) from the lower-layer RDS.
   (3) Acquisition of lifeline information ((100 bytes/$n_3$)×$p_3$) from the lower-layer RDS.
   (4) Accumulation and holding of the lifeline information ((100 bytes/$n_3$)×$p_3$)×$p_2$ acquired from the lower-layer RDSs of $p_2$ stations.
   (5) Data having an intermediate degree of emergency is extracted from the lifeline information, and data sets of (20 bytes/terminal)×$p_3$×$p_2$ (called maintenance information) are generated.
   (6) Division of the maintenance information of (20 bytes/terminal)×$p_3$×$p_2$ (the number of divided portions is $n_2$), and holding of the divided portions for a predetermined period of time.

6. The center station sequentially polls the upper-layer RDSs of the $p_1$ stations to collect event change information and maintenance information or event change information and detailed information. For one polling period, $[(10+20/n_2) \times p_3 \times p_2]$ bytes are collected from the upper-layer RDSs.

7. As a result of item 6, every polling period, pieces of event change information of $(10 \text{ bytes/terminal}) \times p_3 \times p_2 \times p_1$ are collected. Here, $p_3 \times p_2 \times p_1$ is the total number of house terminals.

8. As a result of item 6, every $n_2$ polling periods, pieces of maintenance information of $(20 \text{ bytes/terminal}) \times p_3 \times p_2 \times p_1$ are collected. More specifically, the pieces of maintenance information are collected from all the house terminals every $n_2$ periods.

9. The pieces of lifeline information $(100 \text{ bytes/terminal}) \times p_3 \times p_2$ are accumulated and held in the databases in the upper-layer RDSs for a predetermined period of time.

10. In place of the maintenance information, lifeline information is transmitted to the center station as needed. $5 \times n_2$ polling periods are required.

11. Each upper-layer RDS sequentially polls lower-layer RDSs of the $p_2$ stations to collect event change information and lifeline information. For one polling period, $[(10+20/n_3) \times p_3]$ bytes are collected from the lower-layer RDSs.

12. The following is apparent from items 7 to 11. From all the house terminals to the center station, (1) event change information having a high degree of emergency is transmitted for a short time (every polling period T1), (2) maintenance information having a second-high degree of emergency is transmitted in $n_2$ polling periods, and (3) lifeline information is transmitted for $5 \times n_2$ polling periods, if necessary. The above three objects can be achieved by using one information transmission path.

13. An upper-layer polling period $T_1$ is given by the following equation:

$$T_1 = [8 \times (10+20/n_2) \times p_3 \times p_2 \times p_1]/r_1$$

where $r_1$ is the effective data transmission rate of the upper polling layer.

14. An intermediate-layer polling period $T_2$ is given by the following equation:

$$T_2 = [8 \times (10+100/n_3) \times p_3 \times p_2]/r_2$$

where $r_2$ is an effective data transmission rate of the intermediate polling layer.

15. A lower-layer polling period $T_3$ is given by the following equation:

$$T_3 = (8 \times 100 \times p_3)/r_3$$

where $r_3$ is the effective data transmission rate of the lower polling layer.

16. In order to ensure that data collected in the center station and the upper layer RDS is the latest data, the condition $$T_1 \geq T_2 \geq T_3$$

must be satisfied.

17. When the condition $$T_1 = T_2 = T_3$$

is satisfied, the data transfer efficiency is 100%. Under this condition, $r_1$, $r_2$, and $r_3$ have the following relationships:

$$r_2 = r_1 \times (1/p_1) \times (10+100/n_3)/(10+20/n_2)$$

$$r_3 r_2 \times (1/p_2) \times [100/(10+100/n_3)] = r_1 \times (1/p_1) \times (1/p_2) \times [100/(10+20/n_2)]$$

18. Actually, $r_2$ and $r_3$ are set to be slightly higher than the above values.

$$r_2 = r_1 \times (1/p_1) \times (10+100/n_3)/(10+20/n_2) \times (1+\delta)$$

$$r_3 = r_1 \times (1/p_1) \times (1/p_2) \times [100/(10+20/n_2)] \times (1+\delta)$$

where $\delta \ll 1$.

19. The memory capacity required for a database in a lower-layer RDS: (1) $100 \times p_3$ bytes: 100 bytes of data are collected from the house terminals and stored. (2) $10 \times p_3$ bytes: 10 bytes are extracted from 100 bytes and stored.

20. The memory capacity required for a database in an upper layer RDS:
   (1) $100 \times p_3 \times p_2$ bytes: 100 bytes of data are collected from the house terminals, stored, and held. (2) $20 \times p_3 \times p_2$ bytes: 20 bytes of data are extracted from 100 bytes and held. (3) 10 bytes×$p_3$×$p_2$ bytes: event change data of $p_3$×$p_2$ house terminals are collected and stored.

21. The memory capacity required for a database in the center station: (1) 100×$p_3$×$p_2$×$p_1$ bytes: Pieces of lifeline information collected from all the house terminals are stored and held. (2) 20×$p_3$×$p_2$×$p_1$ bytes: A latest F frame of pieces of maintenance information collected from all the house terminals is stored and held. (3) 10×$p_3$×$p_2$×$p_1$×(24×60/$T_1$): event change information for the latest 24 hours is stored and held.

22. (Data quantity of each layer of system)

TABLE 2

|  | UNIT (NUMBER) | QUANTITY OF INFORMATION (BYTES)/UNIT | TOTAL QUANTITY (BYTES) |
| --- | --- | --- | --- |
| HOUSE TERMINAL LEVEL | $p_3 \times p_2 \times p_1$ | 100 | $100 \times p_3 \times p_2 \times p_1$ |
| LOWER-LAYER RDS LEVEL | $p_2 \times p_1$ | $100 \times p_3$ | $100 \times p_3 \times p_2 \times p_1$ |
|  |  | $10 \times p_3$ | $10 \times p_3 \times p_2 \times p_1$ |
| UPPER-LAYER RDS LEVEL | $p_1$ | $100 \times p_3 \times p_2$ | $100 \times p_3 \times p_2 \times p_1$ |
|  |  | $10 \times p_3 \times p_2$ | $10 \times p_3 \times p_2 \times p_1$ |
|  |  | $20 \times p_3 \times p_2$ | $20 \times p_3 \times p_2 \times p_1$ |
| CENTER STATION | 1 | $100 \times p_3 \times p_2 \times p_1$ | $100 \times p_3 \times p_2 \times p_1$ |
|  |  | $10 \times p_3 \times p_2 \times p_1 \times 24 \times 60/T_1$ | $10 \times p_3 \times p_2 \times p_1 \times 24 \times 60/T_1$ |
|  |  | $20 \times p_3 \times p_2 \times p_1 \times F$ | $20 \times p_3 \times p_2 \times p_1 \times F$ |

23. (Time required to collect three types of information)

TABLE 3

|  | QUANTITY OF INFORMATION (BYTES) | COLLECTION TIME (MIN) |
| --- | --- | --- |
| DETAILED LIFELINE INFORMATION | $100 \times p_3 \times p_2 \times p_1$ | $T_1 \times (n_3 + n_2 \times 5)$ |
| EVENT CHANGE INFORMATION | $10 \times p_3 \times p_2 \times p_1$ | $T_1$ |
| MAINTENANCE INFORMATION | $20 \times p_3 \times p_2 \times p_1$ | $T_1 \times (n_3 + n_2)$ |

24. Pieces of lifeline information are classified into three types according to the degree of emergency of information collection.

25. Event change information having the highest degree of emergency is collected for a short time ($T_1$ minutes).

26. Three types of information are transmitted from a house terminal to the center station by using one communication path. In order to make this possible, lower-layer RDSs and upper-layer RDSs are distributed in the middle of the communication path. Event change information is generated in the lower-layer RDS, and maintenance information is generated in the upper-layer RDS.

27. Required quantities of memory are added to distributed high-speed databases, so that various data processing functions can be achieved. A database network having characteristics depending on the object can be structured.

28. (Method of determining the number of upper-layer relay/database stations $p_1$ and the number of lower-layer relay database stations $p_2$)

A penalty function is defined for the database network having a three-layer structure by the following equation:

$$f = a_1 \times p_1 + a_2 \times p_2 + a_3 \times p_3,$$

where $p_1 \times p_2 \times p_3 = C$, the number of house terminals. A procedure for determining $p_1$, $p_2$, and $p_3$ will be considered in two steps. First, $p_1$ is regarded as a constant, and the relationship between $p_2$ and $p_3$ is determined. Under this condition, the value of $p_1$ is determined.

$$p_2 \times p_3 = C/p_1$$

Since the right-hand side is regarded as a constant, $$p_3 = (C/p_1)(1/p_2)$$

Here, a penalty function $f_2$ about the relationship between $p_2$ and $p_3$ is defined.

$$f_2 = a_2 p_2 + a_3 p_3$$

-continued
$$= a_2 p_2 + a_3 (C/p_1)(1/p_2)$$

$p_2$ which gives the extreme value of $f_2$ will be calculated.

$$\delta f_2/\delta p_2 = a_2 p_2 - a_3 (C/p_1)(1/p_2^2) = 0$$

From the above equation, $$p_2 = (a_3/a_2)^{(1/2)} \times (C/p_1)^{(1/2)}$$

is obtained. Therefore, $p_3$ is given by:

$$p_3 = (a_2/a_3)^{(1/2)} \times (C/p_1)^{(1/2)}.$$

When these values are put in the equation for defining f, the following equation is satisfied:
From the above equation, $p_1$ which gives the extreme value of f will be calculated.

$$\delta f/p_1 = a_1 - (a_2 a_3 C)^{(1/2)} \times [1/(p_1^{(3/2)})] = 0$$

Therefore, $$p_1^3 = a_2 a_3 C/a_1^2$$

or $$p_1 = (a_2 a_3/a_1^2)^{(1/3)} \times (C)^{(1/3)}$$

is satisfied.

The value is substituted in the expressions of $p_2$ and $p_3$:
These values satisfy $p_1 \times p_2 \times p_3 = C$.

It is assumed that $a_1$, $a_2$, and $a_3$ denote communication error generation rates per line connection of the upper-layer polling, the intermediate-layer polling, and the lower-layer polling, respectively. In this case, when $p_1$, $p_2$, and $p_3$ are set to be the above values, the communication error generation rate of the whole network is minimized.

Example

A design of a three-polling information collection/monitor system will be described with reference to an example (Example 2) of a database network.
(Design of Three-layer Polling Information Collection/monitor System)
(Requirements)

The number of all house terminals=$p_3 \times p_2 \times p_1 = 2^{19} = 524288$

Requirement for polling cycle period $T_1 : T_1 \leq 5$ minutes (Design)

The number of divided portions of 20 bytes data: $n_2=4$ (selected by designer)

Required upper polling layer data transmission rate: $r_1 \geq 209.7$ kbps

The number of upper-layer RDSs: $p_1=512$ (selected by designer)

The number of divided portions of 100 bytes data: $n_3=5$ (selected by designer)

Required intermediate polling layer data transmission rate:

$$r_2 \geq 819.1 \times (1+\delta) = 820 \text{ bps}$$

The number of lower-layer RDSs/the number of upper-layer RDSs: $p_2=32$ (selected by designer)

The number of house terminals/the number of intermediate-layer RDSs: $p_3=524288/512 \times 64=16$ Required lower polling layer data transmission rate:

$$r_3 \geq 42.7 \times (1+\delta) = 43 \text{ bps}$$

Event change information collection time: one polling period=5 minutes

Maintenance information collection time: $T_1 \times (n_3+n_2)=45$ minutes

Detailed lifeline information collection time: $T_1 \times (n_3+n_2 \times 5)=125$ minutes Database memory in lower-layer RDS: 1.6 kB+0.16 kB=1.76 kB 32768 sets of the above database memories are used.
Database memory in upper-layer RDS:

$$102.4 \text{ kB}+10.24 \text{ kB}+20.48 \text{ kB}=133.13 \text{ kB}$$

512 sets of the above database memories are used.
Database memory in center station:
52.43 MB (one frame of lifeline information),
104.9 MB (10 frames of maintenance information), and
1.51 GB (event change information for 24 hours)
Adequacy of $p_1$, $p_2$, and $p_3$ selection will be examined.

$$(C)^{(1/3)}=(524288)^{(1/3)}=80.64$$

The following are assumed.

$$(a_2/a_1)=8 \text{ and } (a_3/a_1)=16$$

On the above assumptions, when $p_1$, $p_2$, and $p_3$ are calculated, the following results are obtained:
Selected by designer:
$p_1=512$
$p_2=64$
$p_3=16$
These values are close to the design values obtained when a communication error is minimized.

When the database network system is to be used for emergency notification during the occurrence of a large earthquake, it must be assured according to the object of the invention that the database network system has been normally operating. The operational condition must at least be accurately recognized. For this reason, the database network system is continuously operated, and the main database of the center station is designed to always hold the history of the operation by accumulating specific information data or specific information data and other data for a predetermined period of time. Therefore, it can be determined whether an accident or the like is caused by the disaster.

Since the database network system according to the present invention collects information without interruption as described above, the database network system can collect an enormous quantity of information. For this reason, not only the lifeline data described above, but also a large quantity of other information can be collected. More specifically, as a combination of the pieces of changing information, combinations of data for reading meter values included in lifeline data of meters, data for collecting/monitoring information related to various maintenance jobs, and information data related to security, care of elderly people, water pressures of fire hydrants, and monitors of air-conditioners can be employed.

Various modifications of the embodiments described in detail above can be effected without departing from the range of the spirit and scope of the present invention. Although RDSs having one layer and two layers are exemplified, the number of layers of the RDS can be increased to three or more. In this case, the method of design described above can be similarly applied. Although the database network system according to the present invention has been described above in detail with reference to collection of emergency information of city lifelines, the database network system can also be used to collect other information as described above. In the embodiments, although a radio communication medium is used as a communication medium, a cable communication network including optical fiber communications can also be established and used. Cable communications and radio communications can be selectively used in different layers, and can be selectively used in different areas.

What is claimed is:

1. A multilayer polling database network system for collecting information, comprising:
  a lower polling layer having a plurality of terminal station groups, each group including a plurality ($P_2$) of terminal stations, each terminal station acquiring information, accumulating the information as data, and transmitting the data during a lower-layer polling period ($T_2$);
  a relay database station layer having a plurality ($P_1$) of relay database stations, each relay station database communicating with a corresponding terminal station group for acquiring information ($b_1$) from the terminal stations, extracting specific information ($b_2$) from the information ($b_1$) acquired from the terminal stations, dividing the information ($b_1$) into n (n=1, 2, 3 . . . ) groups and holding the divided information for a predetermined period of time; and a center station for sequentially polling the relay database stations and acquiring ($b_2+b_1/n$)×$P_2$ bytes of information during an upper-layer polling period ($T_1$).

2. A database network system according to claim 1, wherein the upper-layer polling period ($T_1$) and lower-layer polling period ($T_2$) have the following relations:

$$T_1 \geq T_2$$

$$T_1 = [k \times (b_2 + b_1/n) \, P_2 \times P_1]/r_1$$

$$T_2 = k \times b_1 \times P_2/r_2$$

where k: constant $r_1$: the effective data transmission rate between the center station and the relay database stations $r_2$: the effective data transmission rate of the lower polling layer.

3. A database network system according to claim 1, wherein the information is city utility information and the terminal stations are living unit terminals of houses.

4. A database network system according to claim 1, wherein the specific information ($b_2$) extracted from the information ($b_1$) is selected based on a degree of emergency.

5. A database network system according to claim 1, wherein the center station comprises a main database which holds the specific information data and the data for a predetermined period of time to provide a history of the operation.

6. A database network system according to claim 1, wherein the information acquired by the terminal station includes at least one of data for reading meter values, data for collecting/monitoring information related to various maintenance jobs, and information data related to security, care of elderly people, water pressures of fire hydrants, and monitors of air-conditioners.

7. A database network system according to claim 1, wherein the plurality of relay database stations includes at least one upper-layer relay database station group and a plurality of lower-layer relay database station groups associated with one of the upper-layer relay database stations, the database relay stations of the lower-layer relay database station group collect information from the terminal station groups, and the center station collects information from the upper-layer relay database stations.

8. A method of collecting data, comprising:

collecting data regarding utility networks at a number ($P_2$) of terminal stations;

arranging the terminal stations into a plurality of groups;

associating each group of terminal stations with at least one of a number ($P_1$) of relay database stations;

transmitting the data ($b_1$) from the groups of terminal stations to the associated relay database station during to a second polling period (T2);

extracting selected information ($b_2$) from the transmitted data ($b_1$) at the relay database stations;

dividing the data ($b_1$) into n (n=1, 2, 3 . . . ) groups; and sequentially polling the relay database stations with a center station to acquire (b1+b2/n)*$P_2$ bytes of information during a first polling period (T1).

9. The method of claim 8, further comprising holding the data $b_1$ at the relay database stations for a predetermined period of time.

10. The method of claim 8, wherein the first polling period ($T_1$) and the second polling period ($T_2$) have following relations:

$$T_1 \geq T_2$$

$$T_1 = [k \times (b_2 + b_1/n) \, P_2 \times P_1]/r_1$$

$$T_2 = k \times b_1 \times p_2/r_2$$

where k: constant $r_1$: the effective data transmission rate between the terminal stations and the relay database stations $r_2$: the effective data transmission rate between the relay database stations and the center station.

* * * * *

UNITED STATES PATENT AND TRADEMARK OFFICE
CERTIFICATE OF CORRECTION

PATENT NO. : 6,484,184 B1  Page 1 of 1
DATED : November 19, 2002
INVENTOR(S) : Shizuo Mizushina et al.

It is certified that error appears in the above-identified patent and that said Letters Patent is hereby corrected as shown below:

<u>Title page,</u>
Item [73], Assignee, should read as follows:
-- [73] Assignee: Hamanen Co., Ltd Hamamatsu (JP)
Telecommunications Advancement Organization of Japan Tokyo (JP) --.

Signed and Sealed this

Fifteenth Day of April, 2003

JAMES E. ROGAN
*Director of the United States Patent and Trademark Office*